United States Patent
Ditner et al.

(10) Patent No.: US 6,675,250 B1
(45) Date of Patent: Jan. 6, 2004

(54) FAULT TOLERANT COMMUNICATIONS USING A UNIVERSAL SERIAL BUS

(75) Inventors: John Ditner, New Hamburg (CA); Marc Morin, Waterloo (CA)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 09/782,918

(22) Filed: Feb. 13, 2001

(51) Int. Cl.⁷ .......................... G06F 13/00; H04L 12/50

(52) U.S. Cl. .................. 710/305; 370/364; 709/250

(58) Field of Search .................. 710/305, 63, 300, 710/72, 14, 107; 370/257, 364, 400, 423; 709/253, 220, 250; 714/4

(56) References Cited

U.S. PATENT DOCUMENTS

| | | |
|---|---|---|
| 5,903,777 | 5/1999 | Brief |
| 6,021,129 * | 2/2000 | Martin et al. |
| 6,044,428 | 3/2000 | Rayabhari |
| 6,092,210 * | 7/2000 | Larky et al. |

OTHER PUBLICATIONS

"New protocol transfer moduule for USB 2.0—to —IEEE 1394 interfaces using synchronous packet control audio and video data streams" by S Fujimori et al. (Abstract only).*
ISO/IEP "*Information Technology–Generic Coding Of Moving Pictures And Associated Audio: Systems,*" ISO/IEC 13818–1 Nov. 13, 1994, 135 pages.
ISO/IEP "*Information Technology–Generic Coding Of Moving Pictures And Associated Audio Information: Video*", ISO/IEC 13818–2, 1995, 209 pages.
ISO/IEP "*Information Technology–Generic Coding Of Moving Pictures And Associated Audio: Audio*", ISO/IEP 13808–3, Nov. 11, 1994, 104 pages.
"*Universal Serial Bus Specification*", Revision 1.1, Sep. 23, 1998, 314 pages.

\* cited by examiner

*Primary Examiner*—Gopal C. Ray
(74) *Attorney, Agent, or Firm*—Beyer Weaver & Thomas LLP

(57) ABSTRACT

A system and method of operation for connecting at least one USB function to at least two USB hosts is presented. The system of provides a USB tree between each USB host and the at least one USB function. The system further contains provisions for isolating a given USB host from the at least one USB function.

15 Claims, 4 Drawing Sheets

FAULT TOLERANT COMMUNICATIONS USING A UNIVERSAL SERIAL BUS

FIELD OF THE INVENTION

The invention relates generally to the area of communication buses, and more particularly to a system and method for communicating between a device and multiple hosts of a Universal Serial Bus.

BACKGROUND OF THE INVENTION

The provision of redundant systems in areas where uninterrupted operation is required are well known. Such uninterrupted operations may be desired for any combination of economic and safety considerations. Redundant systems are found in many industrial settings including; chemical plants and utility power systems. Redundant systems are also employed in real time computer and communications systems as might by used in on-line data processing systems as are used in banking and telephone switching, for example. It is also often the case where critical systems are located in remote, difficult to access or hazardous locations. In such cases the provision of redundancy not only allows for improved operational reliability but allows for system maintenance and software or firmware upgrading to be performed remotely as the operations can be assigned to the system that is not currently being upgraded.

Computer systems used in the above applications often take the form of industrial or "rack based" computers. Such computers will comprise a system processor and one or more peripheral boards. The system processor provides control functions for the industrial computer and controls the communications amongst peripheral boards. The peripheral boards provide the functionality of the industrial computer. The particular peripheral boards selected for use in an industrial computer are determined by the tasks to be performed by a given industrial computer.

It is often the case that one would like a given industrial computer to have a high degree of reliability. Redundant components can be used to increase the reliability of the computer by providing continued functionality in cases of component failure. It is also the case that one does not wish to provide redundant peripheral boards due to the cost and physical space requirements of this option. However, redundant system processors and communication buses may be provided in industrial computers. In such cases the industrial computer will comprise one or more peripheral boards, two or more system processors, and two or more redundant buses that are connected to and associated with the redundant system processors.

The Universal Serial Bus (USB) has achieved more widespread use over the last several years in the Personal Computer (PC) field. The bus is a serial telecommunications bus configured in a tiered star topology. A USB is suited to large real-time data such as voice, audio and compressed video. The protocols of the USB are outlined in the Universal Serial Bus Specification, Revision 1.1, Sep. 23, 1998.

There are numerous attributes of the USB that have allowed this increase in use including; 'plug and play' capabilities that allow a given device to be added or removed from the USB without reinitialization, the ability to leave an unterminated end on the bus, and the ability for data transfer rates of up to 25 Mbits/s and the ability to connect up to 127 devices to a single port at the USB. The above list is not meant to be exhaustive and those of skill in the art may anticipate other advantages of the USB. Those of skill in the art will also recognise many of the above capabilities make the USB attractive for use in industrial computers where there may be a large number peripheral boards to which communication is required. Further, these peripheral boards may be inserted into or removed from the industrial computer during its operation. It is quite that the insertion or removal of a peripheral board does not disturb or disrupt USB communications with the other peripheral boards in the industrial computer.

A USB is well suited to situations where a peripheral board has failed and it is producing large amounts of data to the bus. Since communication on a USB are based on a time stamp, i.e. it sweeps across the various devices for a predetermined length of time and receives data during this time, a USB does not allow continuous interruption of communications due to problems that may be occurring on a single peripheral board.

An example of a typical topology for a USB is shown in FIG. 1. A typical USB star topology takes the form of a pyramid with single USB host 102 at the apex of the pyramid. USBs originating from USB host 102 may either be connected to USB node 104 or USB hub 106. USBs originating from USB hub 106 may in turn be connected to USB nodes 110 or USB hub 108. The bifurcating of the USB from a single connection to host 102 can continue until there are up to 127 USB nodes. USB nodes 104 and 110 accept devices or functions, where a function is a USB device that is able to transmit or receive data over the bus. A USB node can only be connected to a USB hub. Devices 104 that appear to be connected to USB host 102 are actually connected to root USB hub 112 within USB host 102 through which-the USB connections are routed. Finally, each USB forms a point-to-point connection between USB host 102 and USB nodes 104 or 110 with any USB hubs located between these points not being electrically visible. The overall structure between USB host 102 and the plurality of USB nodes is referred to as a USB tree.

As is apparent in FIG. 1 current USB trees consider a single USB host. Thus, a USB is not traditionally configured for operation with multiple USB hosts with one host being the active host and the other being in a standby state. Therefore, there is a need for a system and method of operation that allow a plurality of USB functions to be connected to multiple USB hosts. The system would allow for communication between a plurality of functions and one of multiple hosts. Further, the functions would be isolated from the host that is in a standby state.

SUMMARY OF THE INVENTION

The invention is directed to a system and method of operation for connecting at least one USB function to at least two USB hosts. The system of the invention provides a USB tree between each USB host and the at least one USB function. The system further contains provisions for isolating a given USB host from the at least one USB function.

In accordance with one aspect of the invention a universal serial bus system for communication between multiple universal serial bus hosts and a universal serial bus node is provided. The universal serial bus system comprises; multiple first universal serial bus segments, each having a first end and a second end, each first end being connectable to one of multiple universal serial bus hosts, multiple second universal serial bus segments, each having a first end and a second end, each first end being connectable to a universal serial bus node, multiple isolators, each provided between the second end of one of the first universal serial bus segments and the second end of one of the second universal serial bus segments, each isolator establishing communication between its associated one of the multiple universal serial bus hosts and the universal serial bus node through its associated first and second universal serial bus segments when it is disabled, and isolating the associated one of the multiple universal serial bus hosts from the universal serial bus node when it is enabled, and logic for controlling the enablement/disablement of the multiple isolators.

In accordance with another aspect of the invention a computer using a universal serial bus system for communication between one or more universal serial bus functions and two or more universal serial bus hosts is presented. The computer comprises; multiple universal serial bus hosts, multiple first universal serial bus segments, each of the first universal serial bus segments having a first end and a second end, the first end being connected to one of the multiple a universal serial bus hosts, each of the first universal serial bus segments being associated with the universal serial bus host to which it is connected, multiple connectors forming a universal serial bus nodes, each suitable for receiving a universal serial bus function, multiple second universal serial bus segments, each of the second universal serial bus segments having a first end and a second end, the first end being connected to one of the multiple connectors, each second universal serial bus segment being associated with a universal serial bus host, and two or more isolators, each of the isolators being connected to the second end of a first universal serial bus segment and a second end of a second universal serial bus segment, each isolator being associated with a universal serial bus host, the isolators allowing communication between the a connector and a universal serial bus host when it is disabled, the isolators isolating a connector from a universal serial bus host when it is enabled.

In accordance with another aspect of the invention a method of switching communications from between a universal serial bus function and a first universal serial bus host to between the universal serial bus function and a second universal serial bus host wherein the universal serial bus function is one of at least one universal serial bus functions and the first and second universal serial bus hosts are two of at least two universal serial bus hosts, the at least one universal serial bus function is connected to and communications with the at least two universal serial bus hosts by way of at least two universal serial buses wherein the universal serial bus between a universal serial bus function and a universal serial bus host contains an isolator therebetween is presented. The method comprising the steps of; enabling the isolator located between the universal serial bus function and the first universal serial bus host, the first universal serial bus host being initially active, the first universal serial bus host being initially in communication with the function, disconnecting the first universal serial bus host, disabling the isolator located between the universal serial bus function and the second universal serial bus host, the second universal serial bus host being initially in a standby state, the second universal serial bus host now being the active universal serial bus host, the first universal serial bus host being initially isolated from the function, detecting the presence of a signal on the universal serial bus function by the second universal serial bus host, and enumerating the universal serial bus function by the second universal serial bus host.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF EMBODIMENTS OF THE INVENTION

The current invention provides a system and method for communications between a USB node and one of multiple USB hosts to which the USB node is connected and in communications. The USB node contains a USB function that is suitably connected for communications with the USB host. The current invention is thus applicable in any system with multiple USB hosts, and their associated trees, are attached to and in communication with at least one USB node.

Figure 2:
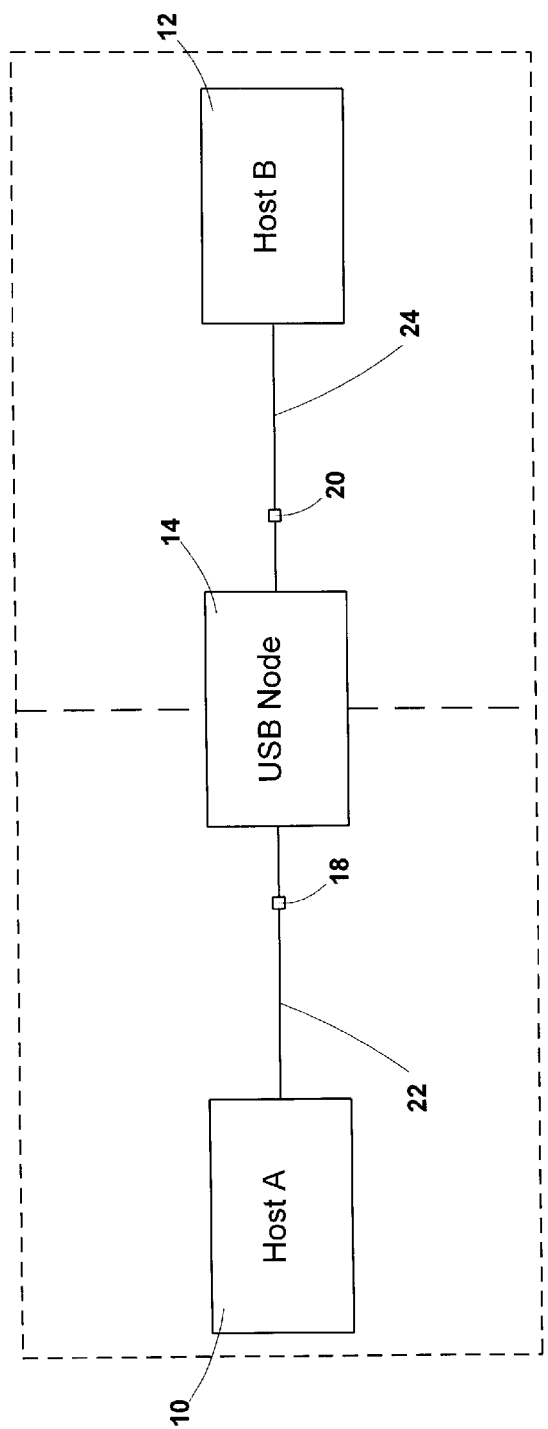
FIG. 2 is a schematic diagram illustrating the general architecture of the system for USB communications according to one embodiment of the invention.

FIG. 2 illustrates a system according to one embodiment of the invention. The system comprises first USB host A 10 and second USB host B 12. USB node 14 is designed for the acceptance of a USB fiction. USB host A 10 and USB host B 12 are redundant elements that are each connected to and able to communicate with the USB function inserted in USB node 14. USB host A 10 and USB host B 12 are connected to USB node 14 via USBs 22 and 24, respectively. Isolators 18 and 20 are located between USB node 14 and USB host 10 and 12, respectively. Isolators 18 and 20 make USB node 14 invisible to USB host 10 and 12, respectively, when they are enabled (i.e. isolating). Isolators 18 and 20; and USBs 22 and 24 are associated with USB hosts 10 and 12, respectively.

Figure 3:
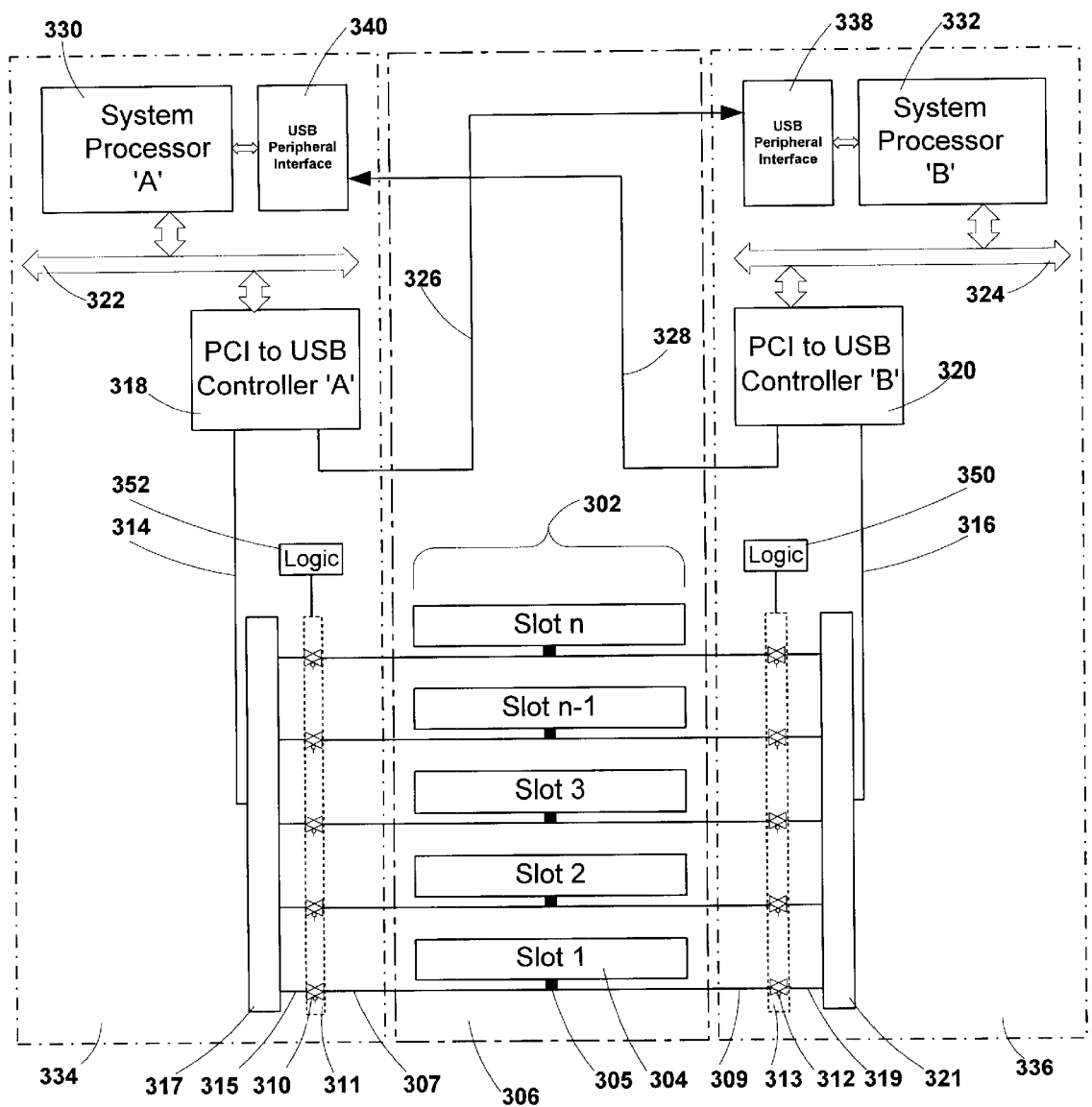
FIG. 3 is a schematic diagram illustrating the architecture of the system for USB communications according to another embodiment of the invention.

FIG. 3 is a schematic diagram of a portion of an industrial computer in which a system according to the current embodiment of the invention is suitably used. The industrial computer comprises a plurality of peripheral boards that are inserted in plurality of slots 302 comprised by midplane 306 of the industrial computer. The peripheral boards act as USB functions. Each of slots 302 comprise a connector for the acceptance of a peripheral board. This connector forms a USB node. By way of example slot 304 is connected to USB node 305. Peripheral boards that are to be inserted into plurality of slots 302 comprise a pull-up resistor that is in-line with the USB node with which the peripheral board is connected. These pull-up resistors are an element of standard USB signalling. The pull-up resistor of a USB function provides an indication to the USB host hosting the USB node comprising that function that a function is present at that USB node. Plurality of slots 302 is shown to comprise five slots, however, it will be apparent to one skilled in the art that the actual number of slots within plurality of slots 302 can be any number up to the limitation of the USB as outlined by the Universal Serial Bus Specification, Revision 1.1, Sep. 23, 1998.

USB node 305 is connected to USB 307 and 309. As schematically indicated in FIG. 3 USB node 305 and a portion of USBs 307 and 309 are located on midplane 306 of the industrial computer. USBs 307 and 309 are connected to isolators 310 and 312, respectively, which are isolators of bank of isolators 311 and 313, respectively. Isolators 310 and 312 may be standard isolators that are placed in-line with a communications bus. Isolators 310 and 312 function such that the peripheral board inserted in slot 304 is either visible or invisible to devices on the other side of the isolator depending on the state of the isolator. The circuitry and operation of isolators 310 and 312 will be known to those skilled in the art. Banks of isolators 311 and 313 are controlled by logic 350 and 352, respectively. Logic 350 and 352 facilitates the switching of active status amongst USB hosts. Logic 350 and 352 is not limited to the devices with which its operation is associated. It is further not limited to its location within either components present in FIG. 3 or components not represented in FIG. 3.

The other side of isolator 310 and 312, i.e. that side opposite to that side which is connected to slot 304, is connected to USB 315 and 319, respectively. USBs 315 and 319 are connected to USB hubs 317 and 321, respectively. USB hubs 317 and 321 are appropriate for the bifurcation of a USB. Their structure and operation will be apparent to those skilled in the art. USBs 314 and 316 form a common USB to which USB hubs 317 and 321, respectively, are connected. This discussion has been presented in terms of those elements to connected slot 304. It will be apparent to one skilled in the art that similar elements and connections are present for the other slots of plurality of slots 302.

USBs 314 and 316 are connected to and in communication with PCI to USB controllers 318 and 320, respectively. These controllers act as an interface between USBs 314 and 316 and PCI buses 322 and 324, respectively. PCI to USB controllers 318 and 320 further act as USB hubs, with USBs 314 and 316 being outputs of the USB hub. In an alternative embodiment there are additional USB hubs located in-line with USB 314 and 316 between controllers 318 and 320 and USB hubs 315 and 321, respectively.

PCI buses 322 and 324 are "system" buses to which a plurality of devices are attached. In particular, they provide for communications between a plurality of devices, including controllers 318 and 320, and system processors 330 and 332. PCI buses 322 and 324 provide for all communications with system processors 330 and 332, respectively, to which they are attached. PCI buses 322 and 324 are bi-directional data paths to the USB hubs formed by PCI to USB controllers 318 and 320, respectively. PCI buses 322 and 324 further allow for high bandwidth communications, are industry standard and allow the use of standard interface integrated circuits. The PCI to USB controller that is connected to a system processor via a given PCI bus will be considered to be associated with that system processor i.e. PCI to USB controller 318 is associated with system processor 330. A given system processor, PCI to USB controller, USB tree and bank of isolators can be considered as elements of a controller board which may physically comprise elements on different boards. The controller boards of the current embodiment are outlined by regions 334 and 336.

System processor 'A' 330 and system processor 'B' 332 are redundant system processors. As part of their functionality system processors 330 and 332 act as USB hosts for the USB to which they are connected and in communications. The communications "system"; including a USB host, USB nodes and any USB hubs there between, that connects a USB host with one or more nodes is referred to as a USB tree. As such a USB host is associated with a particular USB tree. The current embodiment contains two USB trees which are generally comprised by regions 334 and 336. One tree contains USB host 330, USB nodes associated with plurality of slots 302, and the elements there between. The second USB tree contains USB host 330, USB nodes associated with plurality of slots 302, and the elements there between.

USB 326 and 328 connect PCI to USB controller 318 and 320 to USB peripheral interface device 338 and 340, respectively. USB peripheral interface devices 338 and 340 are in turn connected to system processors 332 and 330, respectively. System processor 330 is able to 'see' system processor 332 as a peripheral device using USB 326. Likewise system processor 332 is able to 'see' system processor 330 as a peripheral device using USB 328. Thus, USBs 326 and 328 allow communications between system processors 330 and 332. In the current embodiment USBs 326 and 328 are implemented as conductive traces on midplane 306.

The architecture of the USB in the current embodiment is different from the typical star topology of the prior art, which provides one-to-many communications. First, there are two USB trees attached to a single USB node, which in the current embodiment has a peripheral board inserted in it. This tree structure is able to provide many to many communications.

Figure 1:
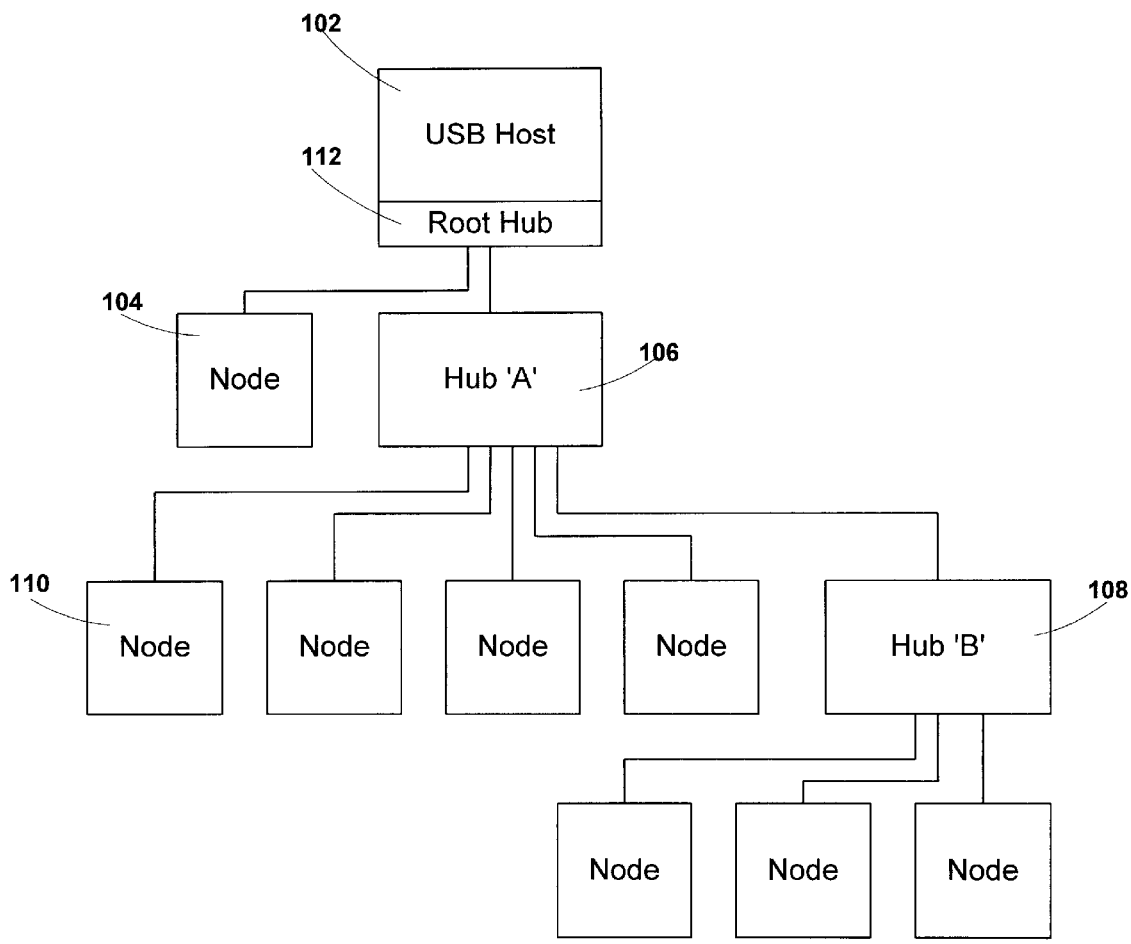
FIG. 1 is a schematic diagram of a typical USB topology of the prior art.

A USB is typically used for point-to-point communications between a USB host and one or more USB nodes. As such there can be and often are a plurality of devices connected to a single USB host at the root of the USB tree resulting in the star topology illustrated in FIG. 1. In the current embodiment, a system and method are presented that allow a peripheral board to communicate with one of multiple hosts using USBs. This communication is facilitated through the use of isolators adjacent to the USB nodes wherein the isolators isolate the USB nodes from the one or more USB hosts with which they are not currently in communication.

In an embodiment of the invention there are generally three events that can lead to a change in status of the active and standby system processors (USB hosts). A change in status of the active USB host will change the USB host to which USB nodes are in communication, as the USB nodes will communicate with the active system processor. The active system processor (USB host) will remain active until either; it can be requested to relinquish control to the standby system processor, it can fail in some fashion allowing a timeout mechanism to force it out of an active state or it can be physically removed from the system. In either the first or second situation the system processor will be forced into a standby state. A similar result will occur should the system processor be physically removed. At the same time as the initially active system processor is being isolated and placed in standby, the standby system processor will assume active status.

A separate cross-coupled arbitration scheme insures that one, and only one, system processor and its associated control board have control of the industrial computer in which the current embodiment of the invention is suitably used. At initial power-up of the industrial computer, the separate cross-coupled arbitration scheme sets one system processor to be in active mode, and the other system processor to be in standby mode. The isolators of the bank of isolators associated with the active system processor are disabled such that the active system processor can enumerate, via the USB, any peripheral boards that may be installed in slots of plurality of slots 302. The standby system processor will remain in standby mode with its isolators enabled such that the USB tree with which the standby system processor is associated is isolated from the peripheral boards.

Figure 4:
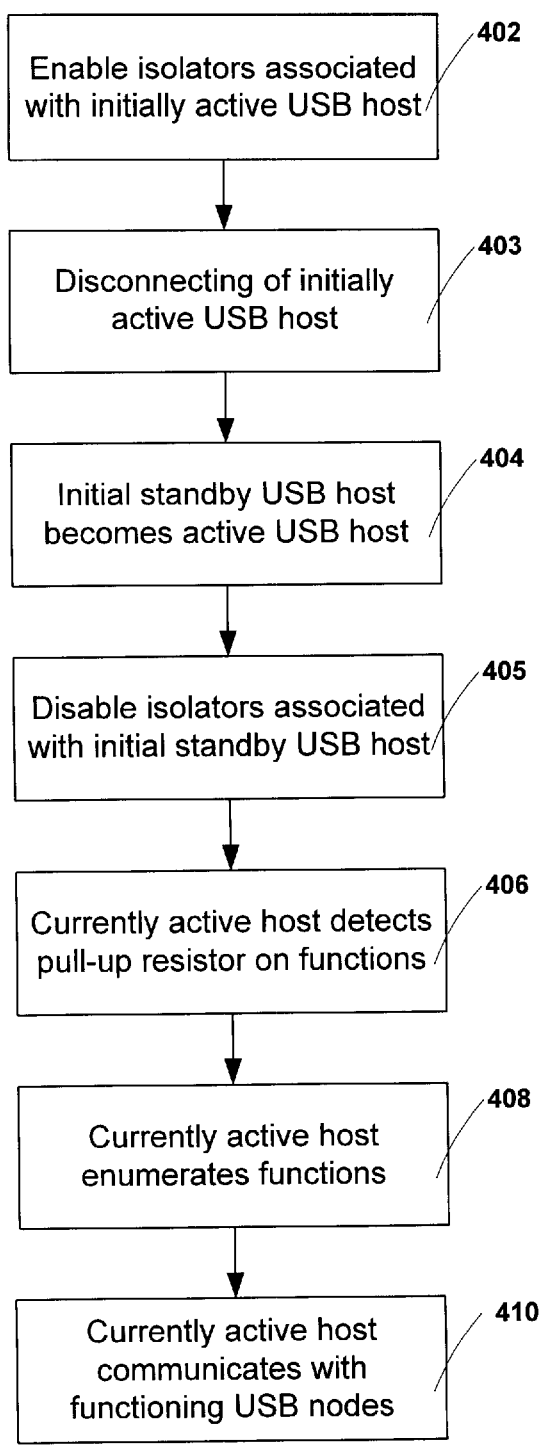
FIG. 4 is a flow chart of the basic process for switching from one controller to a second controller according to an embodiment of the invention.

The basic process of switching USB host functions from the active USB host to the standby USB host, according to an embodiment of the invention, is illustrated in the flow chart of FIG. 4. For illustrative purposes it is assumed that an initially active USB host (e.g. 330) is to enter a standby state and the USB host in a standby state (e.g. 332) is to become active. At step 402 the isolators (e.g. 311) between USB nodes and initially active USB host 330 are enabled. At this point all USB nodes will be invisible to initially active USB host 330 as USB host 330 can no longer detect the pull-up resistors contained on the USB functions. Initially active USB host 330 will correctly assume that there are no USB nodes (e.g. 305) available with which it can communicate. This will result in a disconnect of the USB functions from now inactive USB host 330 at step 403. System processor 332 assumes active status at step 404. At step 405 isolators 312 between the USB nodes and currently active USB host 332 are disabled. The presence or absence of a USB function inserted in a given USB node (e.g. 305) is determined by the detection of the pull-up resistor on the USB function. The detection of this pull-up resistor by now active USB host 332 takes place at step 406. This is standard USB signaling methodology. At step 408 USB host 332 enumerates the USB functions associated with the USB nodes (e.g. 305). The USB functions are now visible to newly active USB host 332 and can thus communicate with it at step 410.

In the current embodiment there are two system processors or USB hosts and two USB trees. While it is often the case that there will be two redundant processors the current invention is not limited to that number. The current structure could be extended to accommodate a larger number of USB hosts. The current invention is also not limited to a specific number of USB functions. The number of USB functions will be determined by a particular application with a maximum being set by the USB protocol, e.g. Universal Serial Bus Specification, Revision 1.1, Sep. 23, 1998.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A universal serial bus system for communication between multiple universal serial bus hosts and a universal serial bus node, the universal serial bus system comprising:
   multiple first universal serial bus segments, each having a first end and a second end, each first end being connectable to one of multiple universal serial bus hosts;
   multiple second universal serial bus segments, each having a first end and a second end, each first end being connectable to a universal serial bus node;
   multiple isolators, each provided between the second end of one of the first universal serial bus segments and the second end of one of the second universal serial bus segments, each isolator establishing communication between its associated one of the multiple universal serial bus hosts and the universal serial bus node through its associated first and second universal serial bus segments when it is disabled, and isolating the associated one of the multiple universal serial bus hosts from the universal serial bus node when it is enabled; and
   logic for controlling the enablement/disablement of the multiple isolators.

2. A universal serial bus system according to claim 1 wherein the second universal serial bus segment forms a direct connection between the isolator and the universal serial bus host.

3. A universal serial bus system according to claim 1, the universal serial bus configuration additionally comprising one or more universal serial bus hubs located between the at least two isolators and the at least two universal serial bus hosts.

4. A universal serial bus system according to claim 1 wherein the universal serial bus node is a connector suitable for the acceptance of peripheral boards.

5. A universal serial bus system according to claim 1 wherein the universal serial bus node is located on a midplane of an industrial computer.

6. A universal serial bus system according to claim 1 wherein the universal serial bus function is a peripheral board.

7. A universal serial bus system according to claim 1 wherein the logic further controls setting an active universal serial bus host from the plurality of universal serial bus hosts.

8. A computer using a universal serial bus system for communication between one or more universal serial bus functions and two or more universal serial bus hosts, the computer comprising:
   multiple universal serial bus hosts;
   multiple first universal serial bus segments, each of the first universal serial bus segments having a first end and a second end, the first end being connected to one of the multiple a universal serial bus hosts, each of the first universal serial bus segments being associated with the universal serial bus host to which it is connected;
   multiple connectors forming a universal serial bus nodes, each suitable for receiving a universal serial bus function;
   multiple second universal serial bus segments, each of the second universal serial bus segments having a first end and a second end, the first end being connected to one of the multiple connectors, each second universal serial bus segment being associated with a universal serial bus host; and
   two or more isolators, each of the isolators being connected to the second end of a first universal serial bus segment and a second end of a second universal serial bus segment, each isolator being associated with a universal serial bus host, the isolators allowing communication between the a connector and a universal serial bus host when it is disabled, the isolators isolating a connector from a universal serial bus host when it is enabled.

9. A computer according to claim 8 wherein the second universal serial bus segment further comprises at least one universal serial bus hub, wherein the at least one universal serial bus hub is connected in-line with the second universal serial bus segment such that the second universal serial bus segment is divided into portions with the universal serial bus hubs located between the portions of the second universal serial bus segments.

10. A computer according to claim 8 wherein the connectors receive a peripheral board.

11. A computer according to claim 8 wherein the connectors are comprised by a passive plane within the computer.

12. A computer according to claim 11 wherein the passive plane is a mid-plane in the computer.

13. A computer according to claim 8 wherein the universal serial bus host is a system processor.

14. A method of switching communications from between a universal serial bus function and a first universal serial bus host to between the universal serial bus function and a second universal serial bus host wherein the universal serial bus function is one of at least one universal serial bus functions and the first and second universal serial bus hosts are two of at least two universal serial bus hosts, the at least one universal serial bus function is connected to and communications with the at least two universal serial bus hosts by way of at least two universal serial buses wherein the universal serial bus between a universal serial bus function and a universal serial bus host contains an isolator therebetween, the method comprising the steps of:

enabling the isolator located between the universal serial bus function and the first universal serial bus host, the first universal serial bus host being initially active, the first universal serial bus host being initially in communication with the function;

disconnecting the first universal serial bus host;

disabling the isolator located between the universal serial bus function and the second universal serial bus host, the second universal serial bus host being initially in a standby state, the second universal serial bus host now being the active universal serial bus host, the first universal serial bus host being initially isolated from the function;

detecting the presence of a signal on the universal serial bus function by the second universal serial bus host; and enumerating the universal serial bus function by the second universal serial bus host.

15. A method of switching communications according to claim 14 wherein the enabling and disabling of the isolators is performed by logic, the logic also facilitating the switching of active status between the first universal serial bus host and the second universal serial bus host.

\* \* \* \* \*